US006705042B1

(12) United States Patent
Harrison

(10) Patent No.: US 6,705,042 B1
(45) Date of Patent: Mar. 16, 2004

(54) FISH HOOK REMOVAL APPARATUS

(76) Inventor: Quinion P. Harrison, 3017 W. Kristal Way, Phoenix, AZ (US) 85027

( * ) Notice: Subject to any disclaimer, the term of this patent is extended or adjusted under 35 U.S.C. 154(b) by 0 days.

(21) Appl. No.: 10/021,926

(22) Filed: Dec. 13, 2001

(51) Int. Cl.$^7$ ............................................. A01K 97/00
(52) U.S. Cl. ........................................................ 43/53.5
(58) Field of Search ................... 43/53.5, 4; D22/149; 7/106; 294/132, 135

(56) References Cited

U.S. PATENT DOCUMENTS

| | | | | |
|---|---|---|---|---|
| 1,728,864 A | * | 9/1929 | Kramer | 43/53.5 |
| 1,777,695 A | * | 10/1930 | Jeffery | 43/53.5 |
| 2,294,758 A | * | 9/1942 | Manske | 43/53.5 |
| 2,493,142 A | * | 1/1950 | Hutton | 43/53.5 |
| 2,507,083 A | | 5/1950 | Anderson | 43/53.5 |
| 2,595,989 A | * | 5/1952 | Smeltz | 43/53.5 |
| 2,619,859 A | * | 12/1952 | Peronto | 43/53.5 |
| 2,670,561 A | | 3/1954 | Howorth et al. | 43/53.5 |
| 2,795,887 A | * | 6/1957 | Lockert | 43/53.5 |
| 2,931,125 A | | 4/1960 | Planin | 43/53.5 |
| RE24,902 E | | 12/1960 | Dillard | 43/53.5 |
| 2,972,205 A | | 2/1961 | Wear et al. | 43/53.5 |
| 3,011,286 A | | 12/1961 | Wallace | 43/53.5 |
| 3,132,438 A | * | 5/1964 | Ward et al. | 43/53.5 |
| 3,214,859 A | * | 11/1965 | Watkins | 43/43.16 |
| 3,419,924 A | | 1/1969 | Archibald | 7/14.1 |
| 3,451,157 A | * | 6/1969 | Jones | 43/53.5 |
| 3,597,775 A | * | 8/1971 | McCasland | 7/106 |
| 3,721,034 A | * | 3/1973 | Collins | 43/53.5 |
| 3,869,822 A | * | 3/1975 | Tieman | 43/53.5 |
| 4,014,130 A | * | 3/1977 | Roberts | 43/53.5 |
| 4,057,863 A | * | 11/1977 | Bewley | 7/132 |
| 4,136,548 A | * | 1/1979 | Dippold | 72/409.04 |
| 4,342,171 A | * | 8/1982 | Cripps et al. | 43/53.5 |
| 4,590,702 A | * | 5/1986 | Chestnutt | 43/53.5 |
| 4,631,855 A | * | 12/1986 | Ader | 43/53.5 |
| 4,833,817 A | * | 5/1989 | Silverthorn | 43/53.5 |
| 5,201,139 A | * | 4/1993 | Middleton | 43/53.5 |
| 5,307,586 A | * | 5/1994 | Palmer | 43/53.5 |
| D369,646 S | | 5/1996 | Richards | D22/149 |
| 5,557,874 A | | 9/1996 | Pietrandrea et al. | 43/4 |
| D379,842 S | | 6/1997 | Richards | D22/149 |
| 5,644,865 A | | 7/1997 | Harrison et al. | 43/53.5 |
| 5,822,915 A | * | 10/1998 | Walker | 43/53.5 |
| 5,921,016 A | | 7/1999 | Shelton | 43/53.5 |
| 5,934,009 A | | 8/1999 | Trahan | 43/53.5 |
| 5,983,555 A | | 11/1999 | Biel | 43/53.5 |
| 6,038,808 A | | 3/2000 | Bergeron et al. | 43/53.5 |
| 6,138,401 A | | 10/2000 | Duncan | 43/53.5 |
| 6,205,698 B1 | | 3/2001 | Richards | |
| 6,205,699 B1 | | 3/2001 | Bogni | 43/53.5 |
| 6,240,673 B1 | | 6/2001 | Shelton | |
| 6,272,788 B1 | | 8/2001 | Bergacker | |
| 6,397,513 B1 | * | 6/2002 | Reed | 43/53.5 |
| 6,438,891 B1 | * | 8/2002 | Aboczky | 43/53.5 |
| 2003/0029075 A1 | * | 2/2003 | Hebard | 43/53.5 |

FOREIGN PATENT DOCUMENTS

| | | | |
|---|---|---|---|
| DE | 3204976 | * | 8/1983 |
| FR | 2599937 | * | 12/1987 |

OTHER PUBLICATIONS

Baker Stainless Steel Hookout® sold at www.basspro-shops.com on Jun. 10, 2002.

* cited by examiner

Primary Examiner—Peter M. Poon
Assistant Examiner—D Parsley
(74) Attorney, Agent, or Firm—Capehart Law Firm; Brent Capehart

(57) ABSTRACT

An apparatus for extracting a fish hook from a fish having a support apparatus for placing over a fish hook embedded in a fish, an operative release member reciprocally removable relative to the position of the fish hook, the release hook attached to move with the operative release member and a lever-operated means for driving the operative release member and the release hook toward and away from the position of the fish hook embedded within the fish.

4 Claims, 7 Drawing Sheets

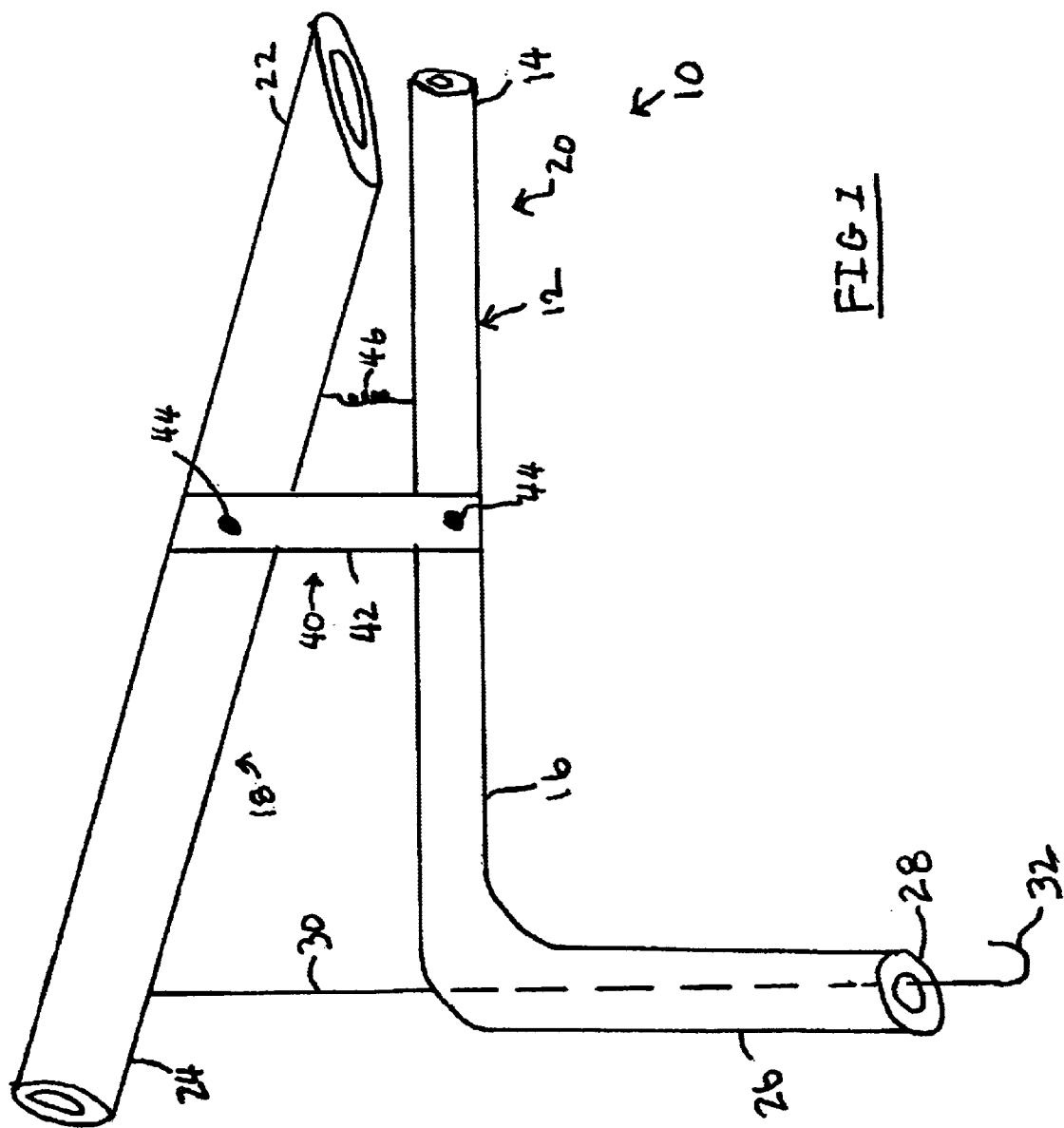

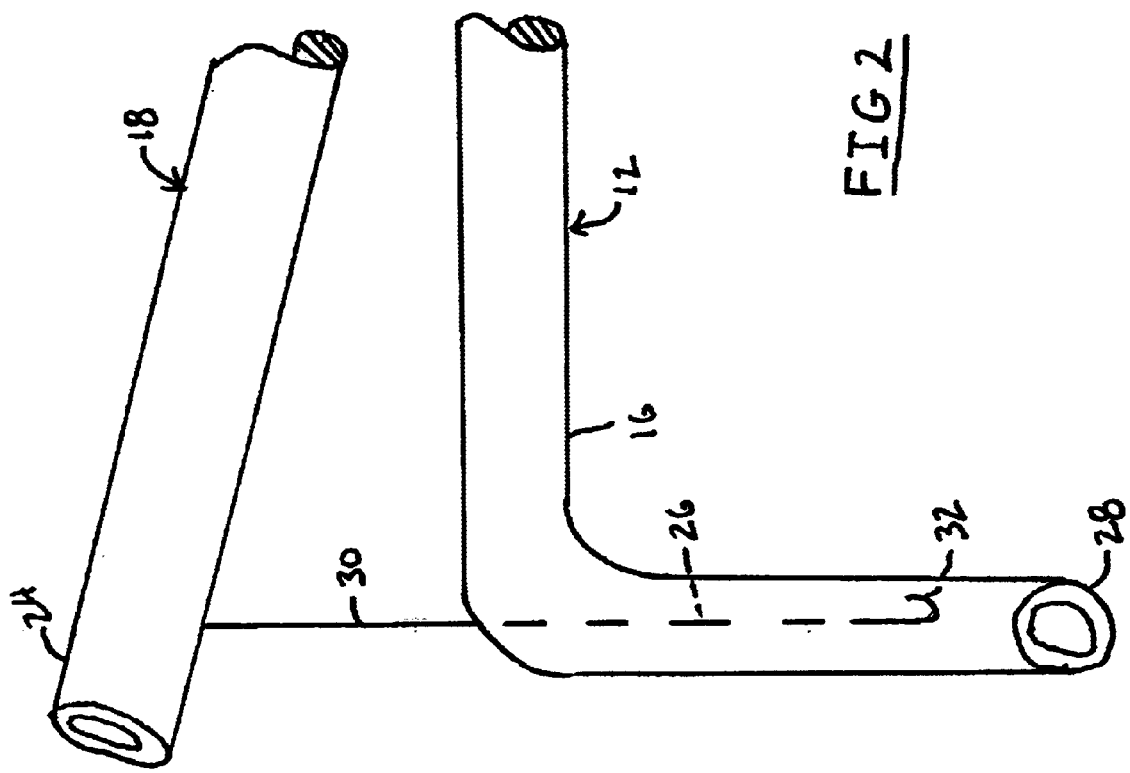

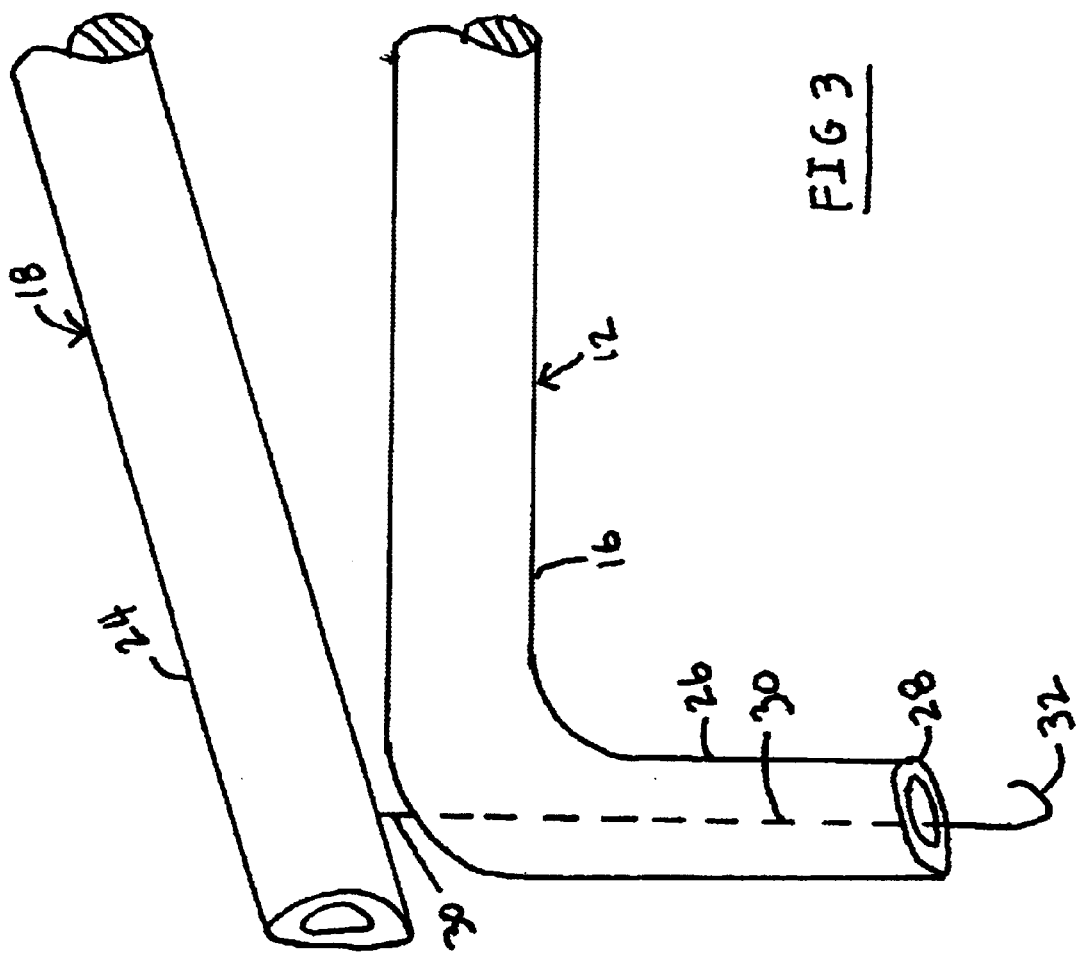

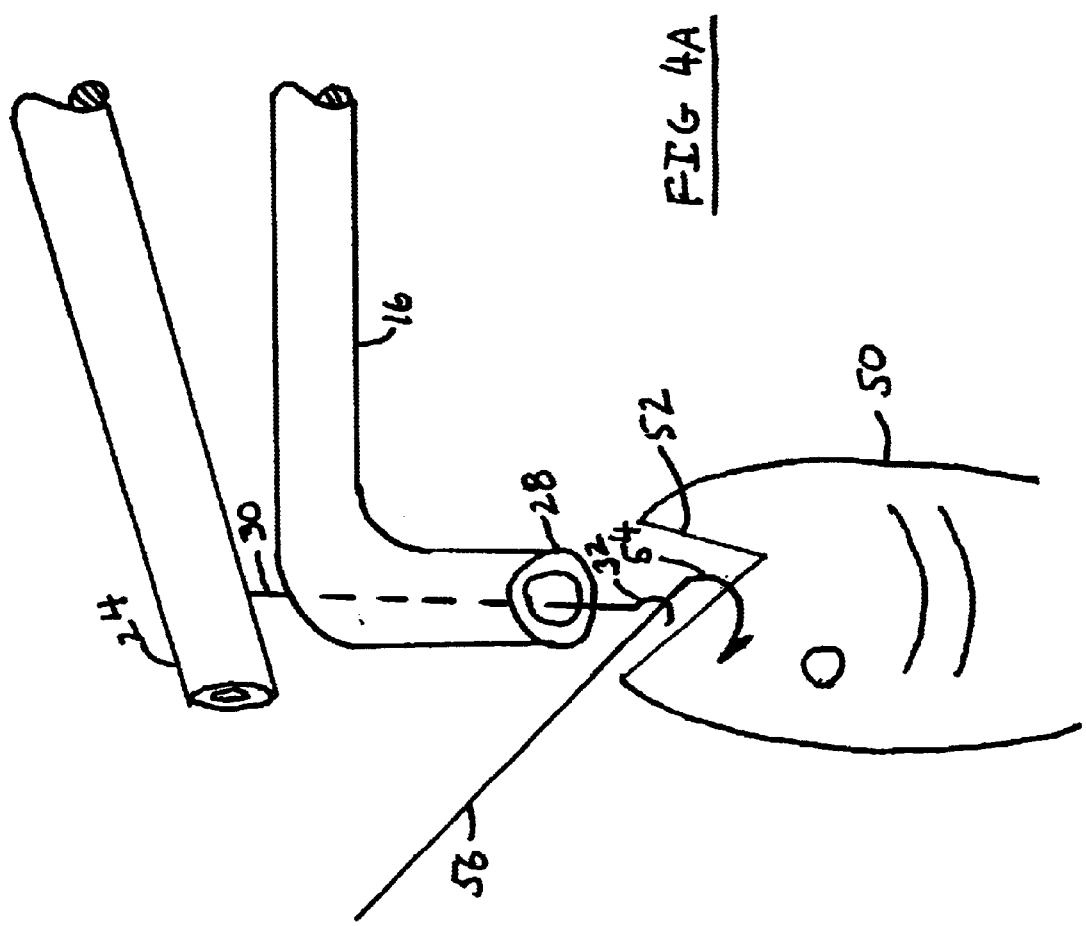

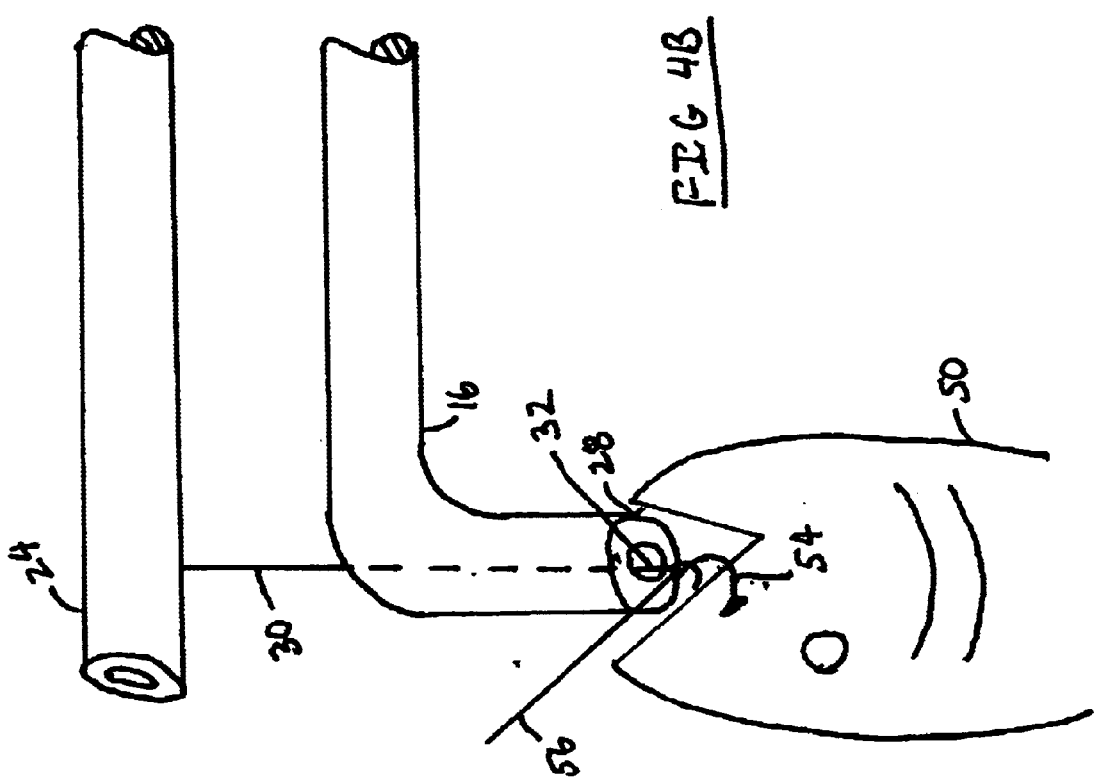

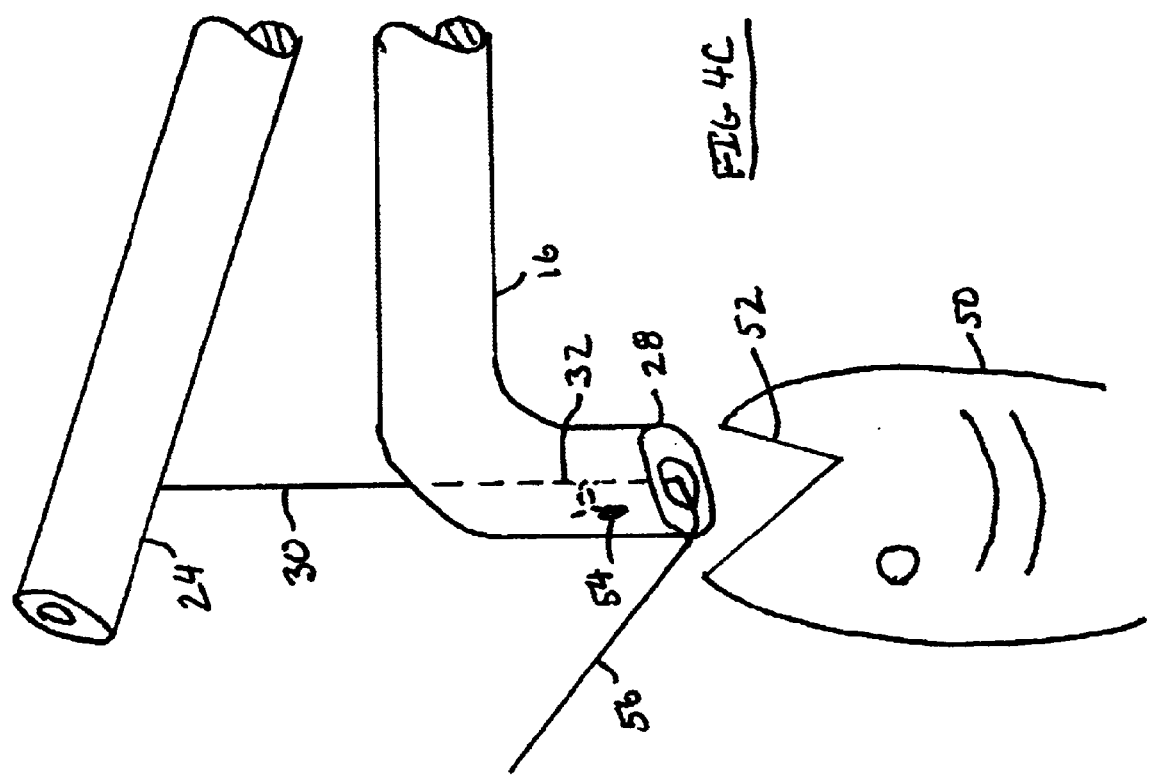

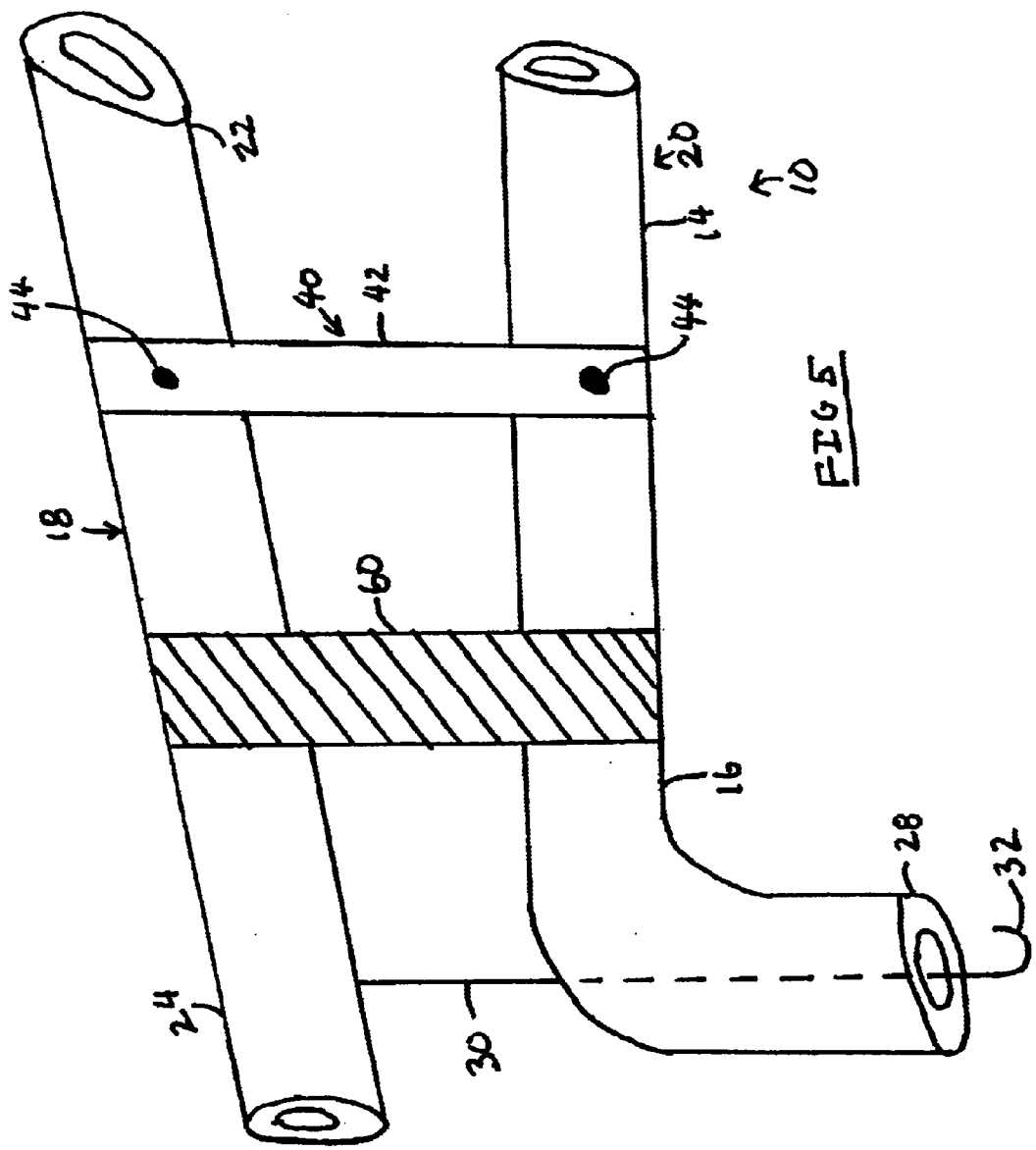

FISH HOOK REMOVAL APPARATUS

REFERENCE TO PENDING APPLICATIONS

This application is not based upon any pending domestic or international patent applications.

REFERENCE TO MICROFICHE APPENDIX

This application is not referenced in any microfiche appendix.

BACKGROUND OF THE INVENTION

The present invention relates to an apparatus that is particularly adapted for removing a fish hook that is embedded into a fish. Since the typical fish hook is barbed, the removal of such from the mouth of a fish can be quite problematic to both the fisherman and the fish. Various apparatuses have been developed to assist in the removal of a fishing hook from the mouth of a fish. For example, U.S. Pat. No. 6,272,788 describes a fish hook-removing device that utilizes an elongated tube having a slot therein for receiving the fishing line attached to the embedded fish hook. This device, however, has a disadvantage in that the threading of the fishing line into the slot can be difficult at best since the fish is typically thrashing and wiggling. Further, to secure the fishing line within the slot, the fisherman must utilize the thumb or the finger to secure the fishing line inside the elongated tube, these disadvantages cause this device to be very difficult to use.

U.S. Pat. No. 6,205,698 discloses a fish hook remover which utilizes a fish hook handle shaped like a pistol-grip and a barrel having a C-shaped configuration at the end of the barrel. A flange is attached near the pistol-grip portion of the device and uses the C-shaped end to secure the fishing hook. The user then feeds the fishing line around the flange and clamps it thereto by way of a thumb. This device is likewise difficult to use in that it requires the use of a thumb to secure the fishing line prior to the removal of the fishing hook.

There is presently a need for a fish hook removal device which is easy and safe to use and can overcome the disadvantages of the known prior art fish hook devices.

Below is a listing of the previous cited art references for this application:

| Patent Number | Inventor(s) | Title |
| --- | --- | --- |
| 6,205,698 | Richards | Fishhook Remover and Method |
| 6,240,673 | Shelton | Fish Hook Remover |
| 6,272,788 | Bergacker | Fish Hook Removing Device |

BRIEF SUMMARY OF THE INVENTION

The present invention satisfies the needs discussed above. The present invention is generally directed toward a fish hook removal device and more specifically toward a fish hook removal device that is simple and easy to operate.

The present invention provides a device for extracting a fish hook from a fish comprising a support apparatus for placing over a fish hook embedded into a fish; an operative release member reciprocate removal relative to the position of the fish hook which can advance toward and away from an advanced position; and a release hook for embracing the fish hook, the release hook is attached to the release member and a lever-operated means for driving the operative release member and the release hook toward and away from the position of the fish hook.

The support apparatus is placed over or near the fish hook. Once the release hook has reached the embedded fish hook, the lever-operated means is manually activated by the fisherman causing the release member and release hook to retract away from the position where the fish hook is embedded in the fish. Since the fishing hook is secured by the release hook it is pulled and removed from the fish.

In yet another aspect, the inventive device comprises a support apparatus, an operative release member, a release hook and a lever-operated means as described above wherein the support apparatus comprises a first handle having a grip end and a forward end, a second handle having a grip end and a forward end and being substantially in line with and pivotally connected to the first handle. A sleeve in communication with the forward end of the first handle (the operative release member and release hook attached thereto) is connected to the forward end of the second handle and is retractable positioned within the sleeve. The lever mechanism created by the pivot between the first and second handles allows the operative release member to travel toward and away from the targeted fish hook. Once the release hook has engaged the fishing hook, the lever mechanism can retract the operative release member and release hook into the sleeve, causing the fish to come in contact with the sleeve and thereby assisting in the removal of the fish hook.

In yet another aspect, the sleeve, as described above, is removably in communication with the first handle.

In yet another aspect, the support apparatus described above can include a spring-type device to assist in the lever function of the inventive apparatus.

In yet another aspect, the support apparatus described above can include an elastic band-type device to assist in the lever function of the inventive apparatus.

In yet another aspect, the release hook and said operative release member as described above are unitary.

Further objects and features of the present invention will be apparent to those skilled in the art upon reference to the accompanying drawings and upon reading the following description of the preferred embodiments.

BRIEF DESCRIPTION OF THE DRAWINGS

FIG. 1 provides a prospective view of an embodiment of a device for extracting a fish hook from a fish provided by the present invention.

FIG. 2 provides a cut-away prospective side view of an embodiment of the apparatus in a retracted position.

FIG. 3 provides a cut-away prospective side view of an embodiment of the apparatus in an extended position.

FIG. 4 A–C provides a prospective side view of an apparatus as provided by the present invention.

FIG. 5 provides a prospective view of an embodiment of a device for extracting a fish hook from a fish provided by the present invention having an elastic band to assist in the pivoting function thereof.

DETAILED DESCRIPTION OF THE PREFERRED EMBODIMENTS

For explaining the present invention in detail, it is to be understood that the invention is not limited in its application to the details of the construction and arrangement of the parts illustrated in the accompanying drawings. The invention is capable of other embodiments and of being practiced or carried out in a variety of ways. It is to be understood that the phraseology and terminology employed herein are for the purpose of description and not of limitation.

As depicted in FIG. 1, the first embodiment 10 of the present invention comprises a support apparatus 20 for placing over a fishing hook 54 embedded in a fish 50. An operative release member 30 being reciprocally movable relative to the position of said fishing hook 54 to advance toward and retract away from such position. A release hook 32 for embracing and engaging the fishing hook 54, the release hook 32 is attached to move in conjunction with the operative release member 30 and a lever-operated means 40 for driving the operative release member 30 and the release hook 32 toward and away from the position of fishing hook 54.

An embodiment of support apparatus 20 as generally shown in the figures comprises a first handle 12 having a first-handle grip 14 and a first-handle forward end 16. A second handle 18 has a second-handle grip end 22 and a second-handle forward end 24 and a sleeve 26 in communication with first handle 12 at its forward end 16. First handle 12 and second handle 18 are substantially in line with each other and pivotally connected by a lever-operated means 40. Operative release member 30 is secured at one end to second handle forward end 24 and runs through sleeve 26.

Sleeve 26 can be removably in communication with first handle 12. Additionally, release hook 32 and operative release member 30 can be made from a single unitary piece of material. Likewise, sleeve 26 and first handle 12 can also be made from a single unitary piece of material.

When apparatus 10 is in a retracted position (i.e. when first handle grip end 14 and second handle grip end 22 are in close proximity to each other), the reciprocal forward ends of the two handles are relatively far apart as shown in FIG. 2. When apparatus 10 is in an extended position, the two forward ends are relatively close together, whereas the two grip ends are relatively far apart as shown in FIG. 3.

When apparatus 10 is in an extended position, release hook 32 extends beyond opening 28 of sleeve 26 as shown in FIG. 3. When apparatus 10 is in a retracted position, release hook 32 retracts completely into sleeve 26 through opening 28.

The operation of this embodiment of the present invention is shown in FIGS. 4A through 4C. With apparatus 10 in an extended position, release hook 32 engages fishing hook 54 which is located within the mouth 52 of fish 50. Second handle 18 is then pivotally moved from an extended position into a retracted position. The lever-operating means 40 causes release hook 32 to become retracted completely inside of sleeve 26, this action causes fishing hook 54 to be withdrawn from mouth 52 of fish 50. At no time during this operation are there any requirements to hook or secure fishing line 56.

As generally illustrated in FIG. 1, an embodiment of lever-operated means 40 comprises a support 42 between first handle 12 and second handle 18 secured by bolts 44. It will be understood by those skilled in the art that while lever-operated means 40 is illustrated by having a support and bolt assembly, other similar and known pivot structures can be utilized. Therefore, the use of support 42 and bolts 44 is merely illustrative and not limiting.

Another embodiment of apparatus 10 comprises the structure set out above with the addition of a spring 46 located between first handle 12 and second handle 18. Spring 46 assists in the pivoting function of the present invention.

Another embodiment of apparatus 10 comprises the structure set out above with the addition of an elastic band 60 located between first handle 12 and second handle 14. Elastic band 60 assists in the pivoting function of the present invention.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. An apparatus for extracting a fishhook from a fish comprising:

a support apparatus for placing over a fishing hook embedded in a fish, said support apparatus having a first tubular member having a handle portion and a sleeve portion with a bend between said handle portion and said sleeve portion; said first tubular member having a bore therethrough and a slot located on the outer surface of said bend, said handle portion having a first handle grip end and a first handle forward end, a support connected to said handle portion between said first handle grip end and said first handle forward end, and a second tubular member having a second handle grip end and a second handle forward end, said second tubular member being substantially in line with said first tubular member, said second handle grip end being positioned in a direction parallel to said first handle grip end and said second handle forward end is positioned in a direction parallel to said first handle forward end, said second tubular member being pivotally connected to said support between said second handle grip end and said second handle forward end in a manner where said first handle grip end is proximate to said second handle grip end when said second handle forward end is distal to said first handle forward end and where said first handle forward end is proximate to said second handle forward end when said second handle grip end is distal to said first handle grip end; and an operative release member having a first end and a second end, said operative release member being secured to said second handle forward end at its first end and having a release hook for embracing said fishing hook at its second end, said operative release member extending through said slot in said first tubular member and through the bore portion of said sleeve portion and being reciprocally movable relative to the position of said fishing hook to advance toward and retract away from such position;

wherein said sleeve portion being dimensioned so that said release hook and at least a portion of said operative release member are within said sleeve portion when said first handle forward end is distal to said second handle forward end and extends beyond said sleeve portion when said first handle forward end is proximate to said second handle forward.

2. The apparatus of claim 1 wherein a spring is connected between said first handle and said second handle to assist in the lever function of the inventive apparatus.

3. The apparatus of claim 1 wherein an elastic band-type device is connected between said first handle and said second handle to assist in the lever function of the inventive apparatus.

4. The apparatus of claim 1 wherein said sleeve and said first handle are unitary apparatus of wherein a spring is connected between said first handle and said second handle to assist in the lever function of the inventive apparatus.

* * * * *